United States Patent [19]
Rosenberg

[11] Patent Number: 5,809,687
[45] Date of Patent: Sep. 22, 1998

[54] FLEXIBLE LINE COUPLING METHOD AND APPARATUS

[76] Inventor: Howard Rosenberg, 3661 State Rd. 84, Fort Lauderdale, Fla. 33312

[21] Appl. No.: 715,564

[22] Filed: Sep. 18, 1996

[51] Int. Cl.⁶ .................................................. A01K 91/04
[52] U.S. Cl. ............................................................ 43/44.83
[58] Field of Search ............................... 43/43.16, 44.83, 43/42.49; 289/1.2, 1.5

[56] References Cited

U.S. PATENT DOCUMENTS

| | | | |
|---|---|---|---|
| 62,042 | 2/1867 | Lee | 43/43.16 |
| 103,645 | 5/1870 | Mascroft | 43/44.83 |
| 675,321 | 5/1901 | Brownfield | 43/43.16 |
| 1,401,086 | 12/1921 | King | 43/44.83 |
| 2,222,277 | 11/1940 | Baker | 43/44.83 |
| 2,847,220 | 8/1958 | Heffron | 43/44.83 |
| 4,361,977 | 12/1982 | Lawler | 43/44.83 |
| 4,905,403 | 3/1990 | Manno | 43/44.83 |
| 5,009,025 | 4/1991 | Austad | 43/44.83 |
| 5,313,736 | 5/1994 | Rosenberg et al. . | |
| 5,537,776 | 7/1996 | Gilard | 43/44.83 |

FOREIGN PATENT DOCUMENTS

| | | | |
|---|---|---|---|
| 65439 | 3/1942 | Norway | 43/44.83 |
| 1292686 | 2/1987 | U.S.S.R. | 43/43.16 |
| 614 | 1/1909 | United Kingdom | 43/44.83 |
| 2030032 | 4/1980 | United Kingdom | 43/44.83 |

*Primary Examiner*—Kurt Rowan
*Attorney, Agent, or Firm*—McHale & Slavin, PA

[57] ABSTRACT

An apparatus and method of attaching a flexible line to a fixed object by use of an improved attachment shank with angled and spaced apart attachment coils. The attachment shank is based upon a one piece shank having at least three angled and spaced apart coils, along with an end coil, formed at one end of the shank with the other end of the shank typically forming a hook, clasp, or the like. The spaces disposed between the angled coils allow for windable insertion of the open end of a loop of fishing line between the spaces. The closed end of the loop extends towards the hooked end and a strand of the loop is wrapped around the shank at least four times. The line extend from the coils and the hook are then pulled in opposite directions which pulls the wound line taunt about the shank and angled coils. The line is thereby tightly secured to the shank through frictional engagement which increases with tension, yet does not unnecessarily bend or bind the attached line.

3 Claims, 4 Drawing Sheets

FLEXIBLE LINE COUPLING METHOD AND APPARATUS

FIELD OF INVENTION

This invention relates generally to a method of attaching a flexible line to a fixed object and, more particularly, to an improved coupling method having a beneficial application for the fishing industry in permitting rapid fish line attachment.

BACKGROUND OF THE INVENTION

As detailed in U.S. Pat. No. 5,313,736 by this same inventor, the coupling of flexible lines such as wire, rope, or string to a fixed object can be performed by countless variations of ties, knots, buckles, or combinations thereof. This temporary tethering of objects is performed by tying the line to the object, typically by use of a coupling attachment such as an eye hook. For example, boat trailers make use of an eye hook placed on the outer hull of the boat for pulling a boat onto a trailer. Similarly, automobile manufacturers provide frame tow hooks to allow pulling of the automobile if necessary. Practically every object that can be pulled uses some form of coupling attachment receptive to flexible line attachment typically accomplished by tying the flexible line into a knot.

A problem with tying a flexible line to a fixed object, to which this invention is directed, occurs in the employment of conventional tethering methods consisting of knots for securing the flexible line to the fixed object. If the flexible line is improperly tied, tension placed upon the line can cause the knot to unravel leading to a catastrophic result. Further, knot tying places the stress on the end of the attachment mechanism, such as an eye bolt, as opposed to the object itself. If an attachment device is used to interface with the flexible line and the attachment device is improperly shaped, the device may cut the line at the attachment point.

A frequent use of knot tying is found in the sport of fishing. Fishing employs a variety of fishing hooks, lures, spoons, artificial bait, weights, and so forth tied onto the end of a fishing line. Fishing requires a fishing line to be attached to some form of bait or lure to be placed at the end of the line. The conventional method of tying the baited hook to the fishing line is by use of an eye formed at one end of the shank wherein the fishing line is tied by use of a knot. If the knot is improperly tied, the bait and hook will be lost.

Improperly tied hooks used in sport fishing of larger fish can be more than just a nuisance in replacing. For instance, competition tuna hooks are hand crafted from stainless steel and are extremely expensive to replace. More importantly, loss of the hook typically leaves a fish with a hook attached in its mouth, which is most undesirable. Although professional operators meticulously tie each hook, if the hook is not properly manufactured to prevent severing of the line, then the aforementioned results will be the same. Even a properly tied line can snap, since the conventional method of tying requires the fishing line to form a 180 degree U-shaped bend about the curvature of the eye. Thus, if the eye is not properly rounded, then it can act as a sharp edge to cut the fishing line.

As previously disclosed, the flexible line coupling method and apparatus of this present inventor which was issued as U.S. Pat. No. 5,313,736. This invention discloses a hook which allows knotless tying of the hook to a fishing line. The hook has a shank with bends which run generally perpendicular to the shank and which form an aperture for insertion of a loop of line. The line loop is twisted onto the downward extending hook at least three times and then pulled tight. While providing a knotless attachment method, the line must still bend sharply around the hook to extend up through the aperture. This sharp bend might prove to be a source of wear on the line.

Thus, what is lacking in the art is a method of tying a flexible line to a fixed object that can be performed without the need for welding additional components onto the coupling device, does not require the tying of a knot, and does not cause sharp bends in the line. Accordingly, a device is needed which places the majority of the strain directly upon the shank of object to be pulled, and not upon various sections of bent or crimped line.

SUMMARY OF THE INVENTION

The present invention satisfies the aforementioned needs by disclosing an apparatus designed to provide knotless tying of any object, with particular use in the fishing industry. The apparatus provides a fixture with a shank having proximal and distal ends extending along an central axis. The proximal end of the shank forms a least three coils with spaces separating the coils. The coils of the shank extend proximally and are acutely angled with respect to the central axis. A final end coil forms a guiding aperture for fishing line or the like which has been appropriately wrapped around the angled coils of the object shank. The shank then extends down to a fish hook or other useful object as would be attached to a flexible line.

This apparatus can be used to practice a method of attaching flexible line to the shank, which includes the following steps: (a) bringing a loop of flexible line with a proximal and distal end in parallel connection with the central axis of the shank; (b) winding the proximal end of the line and the shank and between the spaces formed between the coils until the line extends proximally through the end coil; (c) taking a single strand of the distal loop and wrapping it at least four times around the shank at a point distal to the coils; (d) grasping the portion of the flexible line extending proximally from the end coil; (e) grasping the shank and/or object formed therefrom; (f) pulling the shank and proximally extending flexible line in opposite directions in order to draw the wrapped distal loop strands in tight frictional engagement against the first angled coil.

This apparatus and method of tying has particular benefit in the field of fishing by providing an improved fishing hook permitting ready coupling to a fishing line. The improved fishing hook is formed from a one piece shank having a first end formed into a plurality of angled and spaced apart circular bends. The circular bends provide a frictional wrapping surface for engaging the fishing line. A second end of the shank includes a generally U-shaped bend terminating in a pointed tip, the tip having a barb extending obliquely from one side of the pointed tip. By attaching the fishing line according to the aforementioned steps to the fishing hook, the strength of the fishing line is transferred directly to the shank of the hook, without undue bends being formed in the fishing line. This attachment apparatus and method more closely provides a true poundage test capability as rated by the fishing line manufacturer.

Accordingly, a primary object of the present invention is to provide an improved method of attaching flexible line to a shank which transfers the stress from the flexible line to the shank of the apparatus, without undue bending or crimping of the line.

Still another object of the present invention is to provide a one piece shank design that allows knotless coupling.

Yet still another object of the present invention is to provide a series of angled coils directs the positioning of a flexible line in a predefined location about the longitudinal length of a shank to provide efficient frictional engagement with the first engagement coil, yet also prevents line slicing and sharp stresses induced by bends in the line.

Another object of the present invention is to provide a one piece, inexpensive, fishing hook adaptable to knotless tying of fishing line by unskilled operators.

Another object of the present invention is to provide a looped line attachment method which is wrapped around and through the spaced apart coils at one end of the shank with the loop extending there through, with a strand of the loop being wrapped around the other end of the shank at least four times and drawn tight, to thereby provide frictional engagement along the length of a shank and eliminate the need for crimped line support.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

Figure 1:
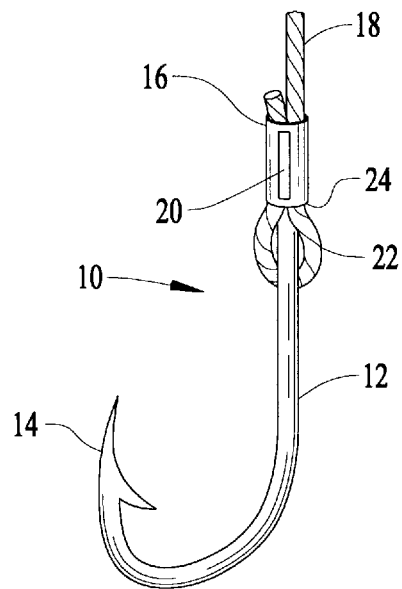
FIG. 1 shows a side elevational view of a Kato tuna fish hook of the prior art.

Referring now to FIG. 1, the aforementioned prior art Kato tuna hook 10 is shown depicted having a sharp tip and barb 14. The shank 12 of the tuna hook 10 forms a base wherein a small pipe 16 is welded thereto. The small pipe 16 forms an aperture therein for insertion of fishing line 18 which is wrapped about the shank 12 and reinserted into the aperture. The small pipe 16 is then squeezed at crimp portion 20 to frictionally engage the fishing line 18. Thus, the fishing line 18 is secured to the tuna hook by a combination of frictional engagement about the outer surface of shank 12 in conjunction with the frictional engagement provided upon crimping the small pipe 16. Once the small pipe is crimped the hook cannot be readily removed and reattached. If the fishing line 18 is sized to perfectly accommodate the aperture of the small pipe 16 the hook may be used without crimping of the small pipe, however, any wear or stretching of the fishing line may cause the line to slide from the hook. Further, due to the sharp bending of the fishing line 18 at a bottom edge 24 of the small tube 16, Kato requires that the small tube is chamfered to prevent slicing of the fishing line 18.

Figure 1A:
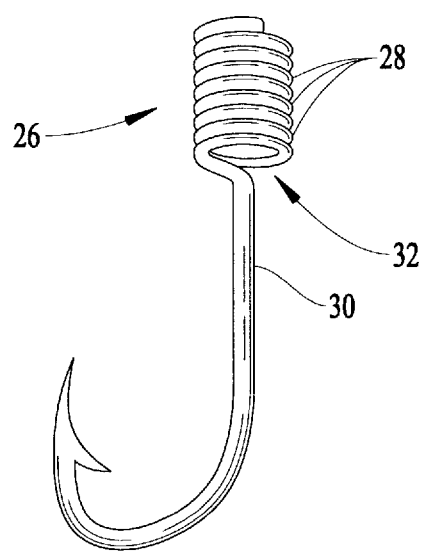
FIG. 1A shows a side lowered view of the prior art attachment device of U.S. Pat. No. 5,313,736.
Figure 1B:
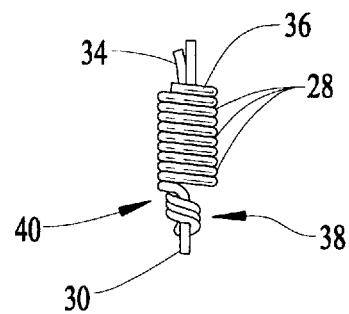
FIG. 1B shows a side view of the prior art attachment device of U.S. Pat. No. 5,313,736 with flexible line attached.

Referring now to FIG. 1A, the prior art attachment device 26 of U.S. Pat. No. 5,313,736 is shown. This device utilizes tightly wound coils 28 with no spacing in between the coils. The coils are also oriented generally perpendicular to the shank 30 to form an aperture 32. Referring also to FIG. 1B, a loop of flexible line 34 is inserted through the coils 28 which juxtaposition each other with no spacing 36. The line is formed into a loop which is twisted 38 about the shank 30 at least three times and then drawn tight. The perpendicular coils 28 might cause undue bending or stress to occur on the line 34 at point 40 where the line curves around the shank 30 and extends up through the aperture 32. Accordingly, it would be preferable to eliminate any such severe bending or crimping of the flexible line.

Referring now to FIGS. 2–9, shown are various embodiments of the attachment mechanism of the instant invention for use in coupling with a flexible line. It is understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 2:
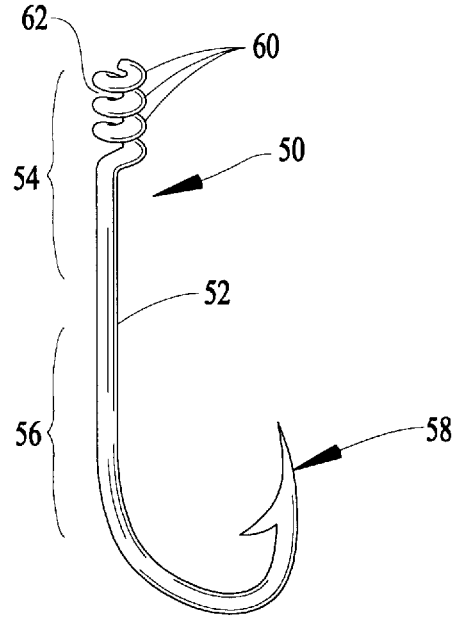
FIG. 2 shows a side elevational view of a the angled coil line attachment end of the present invention formed from the shank of the hook.

FIG. 2 shows a side elevated view of the attachment device of the present invention, as incorporated on an example fish hook. The attachment device might also be incorporated on other objects which need to be attached to a flexible line. The hook 50 has a proximal end 54 and a distal end 56 from the top of the hook. A shank 52 terminates at the distal end 56 in a pointed barb 58. The proximal end 54 terminates in a series of coils 60 which angle proximally upwards. The coils 60 are spaced sufficiently apart 62 in order to allow a loop of flexible line to be wound in between and through the coils.

Figure 3:
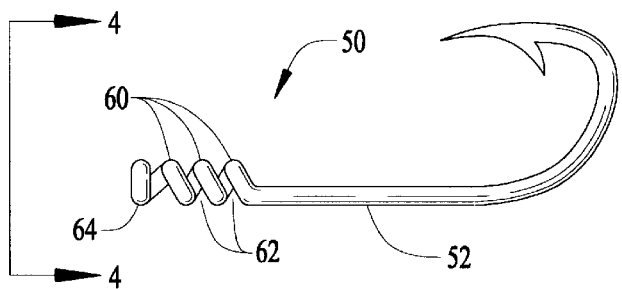
FIG. 3 shows a side view of the angled coil line attachment end of the present invention formed from the shank of the hook.
Figure 3A:
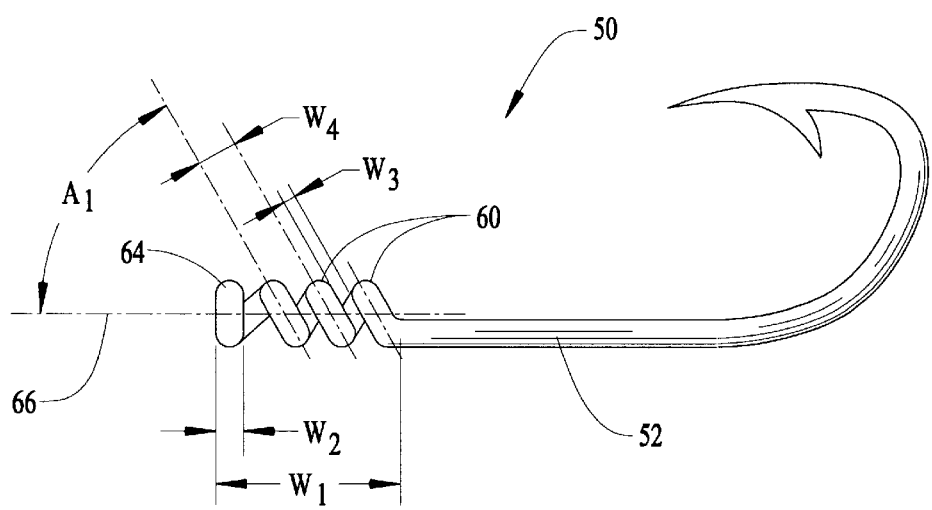
FIG. 3A shows a side view of the angled coil line attachment end of the present invention formed from the shank of the hook, with example structural measurements.

Referring now to FIG. 3, a side view of the fish hook example 50 is shown. The proximally extending angle of the coils 60 can more clearly be seen, along with the spaces 62 separating each coil 60. The end coil 64 can be oriented at an angle, or generally perpendicular to the shank 52 as shown. FIG. 3A shows a more detailed view of the same fish hook 50 with example structural dimensions for constructing an embodiment of the present invention. The shank 52 extends along the centerline of a longitudinal axis 66. Three angled coils 60 are shown which form an angle A1 with the horizontal axis 66. The angled coils 60 and end coil 64 extend proximally along the shaft a width W1, with each coil approximately the same width W2 of the shank 52. The angled coils 60 are separated by a width W4, with a space between each coil of W3. While any set of related dimensions might be used to construct different sized hooks or other such devices, the shown embodiment uses the following: A1=60 degrees; W1=0.670 inches; W2=0.100 inches; W3=0.050 inches; and W4=0.166 inches.

Figure 4:
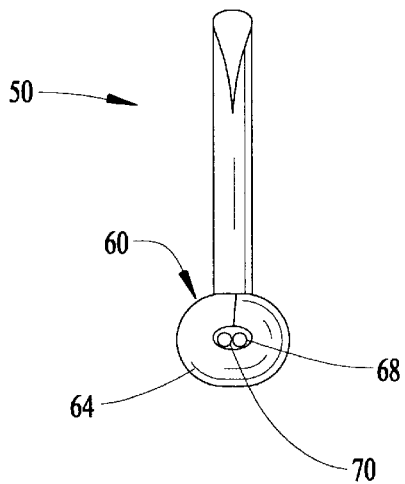
FIG. 4 shows a top view of the hook of FIG. 3 along view 4—4.

Referring now to FIG. 4, a top view of hook 50 according to cut 4—4 in FIG. 3 is shown. The end coil 64 is shown extending over the series of underlying coils 60. A cross section of the two lines 68 and 70 which form a loop extending down through the coils 60 and 64 is also shown.

Figure 5:
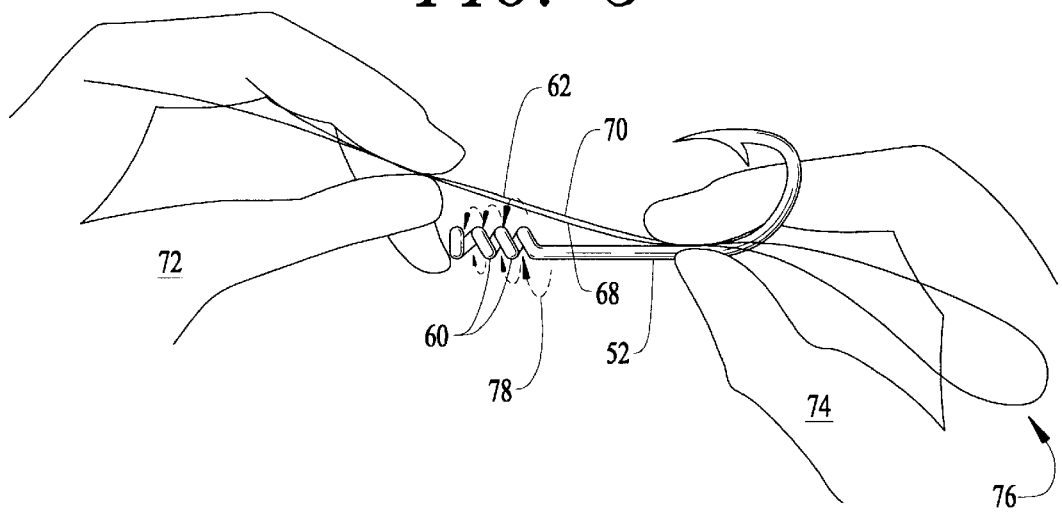
FIG. 5 shows a side perspective view of a hook with the angled coil line attachment end and a directions for weaving a looped flexible line into the spaces between the coils.

FIGS. 5–9 further demonstrate the attachment device of the present invention and the associated method of using the device. FIG. 5 shows the left and right hands 72 and 74 of a user applying a closed loop 76 which is formed by looping a secondary strand of flexible line 70 over upon a primary strand 68. The strands forming the loop 76 are laid in parallel with the shank 52 and wound around the angled coils 60 and into the spaces 62 between the coils, according to the arrow pattern 78.

Figure 6:
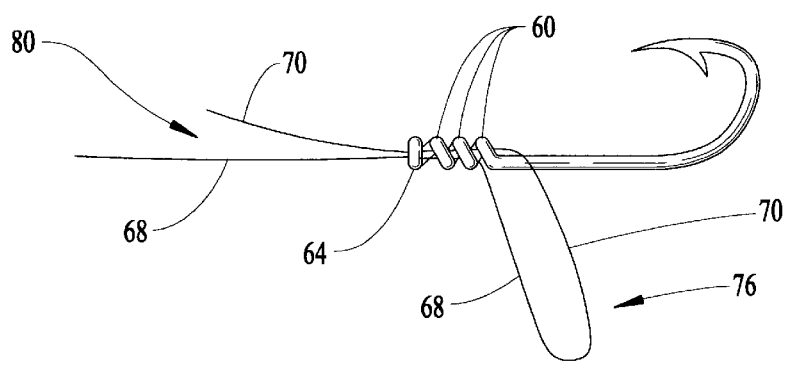
FIG. 6 shows a side perspective view of the hook and flexible line of FIG. 5, with the looped flexible line extending through the end coil.

Referring now to FIG. 6, the steps described for FIG. 5 are shown completed. The open end of the loop 80 extends proximally out from the end coil 64 at one end of the shank 52, with the primary and secondary strands 68 and 70 generally remaining parallel to each other. The closed end of the loop 76 extends distally forward past the angled coils 60.

Figure 7:
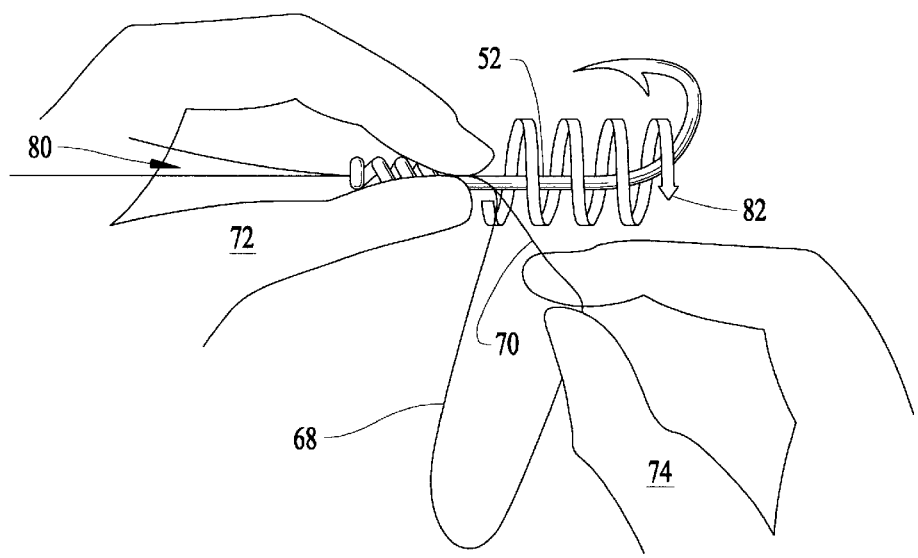
FIG. 7 shows a side perspective view of the hook and flexible line of FIG. 6, with a single strand of the forward extending loop being wrapped around the shank at least four times.

Referring now to FIG. 7, the user holds the open end of the loop 80 in place and then wraps the secondary strand 70 of the closed end of the loop 76 around the shank 52 in a clockwise direction 82 when viewed from the top of the hook (as in FIG. 4). The secondary strand 70 should be wrapped at least four times around the shank 52 as shown.

Figure 8:
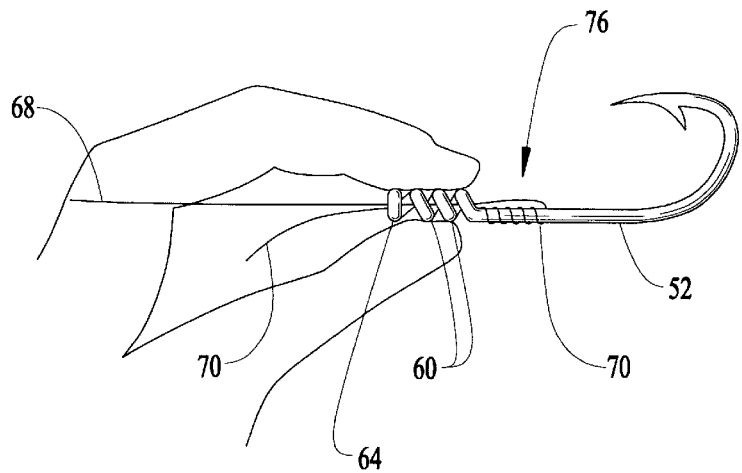
FIG. 8 shows a side perspective view of the hook and flexible line of FIG. 7, with the loop strand wrapped around the shank.

Referring now to FIG. 8, the steps described for FIG. 7 are shown completed. The secondary strand 70 is shown wrapped five times around the shank 52. The closed end of the loop 76 therefore encompasses the shank 52, with the primary strand 68 and secondary strand 70 extending through the proximal end of the angled coils 60 and end coil 64.

Figure 9:
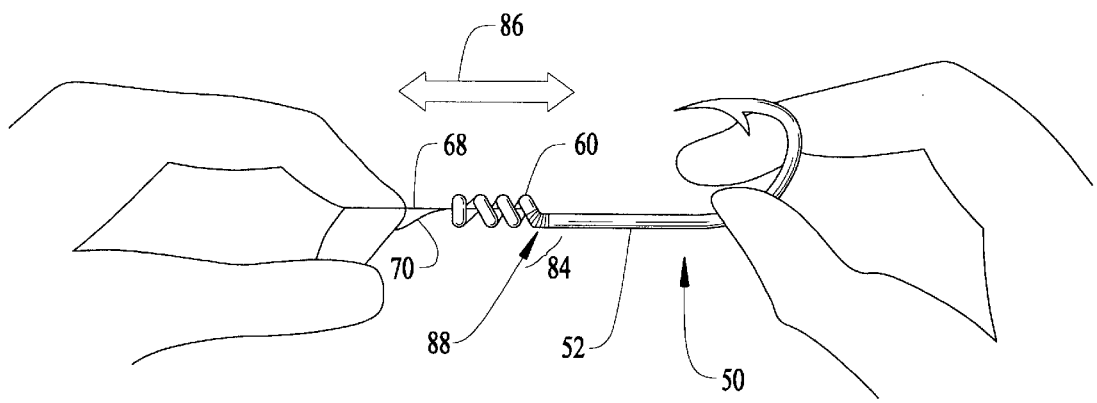
FIG. 9 shows a side perspective view of the hook and flexible line of FIG. 8, with the flexible line and hook being pulled in opposite directions to draw the woven and wrapped flexible line segments into tight frictional contact with first coil of the hook.

FIG. 9 shows the final step which involves pulling the primary strand 68 in the opposite direction from the fish hook 50 as shown by arrows 86. This pulled action causes the closed loop section 76, which has been twisted around the shank 52, to be drawn tight 84 around the most distal angled coil 60. The frictional contact of the line 70 with the coils 60 causes the line segments 68 and 70 to securely attach to the hook. The more tension that is applied to the connection, the more the looped line section 84 tightens around the shank 52 and distal coil 60. The benefit, however, is that the angled shoulder surface 88 presented by the angled coil 60 lessens any stress or binding that might occur on the lines 68 and 70.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and descriptions.

What is claimed is:

1. A method of tying a fishing hook having a shank with a proximal and distal end, said shank having angled and spaced apart attachment coils formed on said proximal end and a hooked barb on said distal end, said method of tying comprising the steps of:

(a) folding a length of a fishing line upon itself to form a loop having an open end and a closed end, said loop characterized by a primary strand and a secondary strand;

(b) laying said loop parallel to said shank with said open end extending proximally and said closed end extending distally and windably interfacing said proximal opened end with said spaces between said coils, said open end thereby depending from said proximal end of said coils;

(c) wrapping said secondary strand of said closed end of said loop a predetermined number of times around said shank to form wound loops distal from said coils; and (d) pulling said primary strand of fishing line which depends from said proximal end of said coils in a direction opposite said fishing hook shank, thereby causing said wound loops to conform to, and frictionally engage, the angled coil on said fishing hook shank.

2. The method of tying a fishing hook according to claim 1, wherein said predetermined number of times for wrapping said secondary strand of said closed end loop is at least four.

3. The method of tying a fishing hook according to claim 1, wherein said angled coils include at least three.

* * * * *